US006830357B2

(12) United States Patent
Lopez

(10) Patent No.: US 6,830,357 B2
(45) Date of Patent: Dec. 14, 2004

(54) ILLUMINATED HOLIDAY VEHICLE WREATH

(76) Inventor: Gerardo Lopez, 18209 Berol Dr., Pflugerville, TX (US) 78660

( * ) Notice: Subject to any disclaimer, the term of this patent is extended or adjusted under 35 U.S.C. 154(b) by 0 days.

(21) Appl. No.: 10/740,819

(22) Filed: Dec. 22, 2003

(65) Prior Publication Data

US 2004/0130890 A1 Jul. 8, 2004

Related U.S. Application Data

(60) Provisional application No. 60/434,651, filed on Dec. 20, 2002.

(51) Int. Cl.[7] .............................. F21S 6/00; B60Q 1/26
(52) U.S. Cl. .................... 362/122; 362/183; 362/496
(58) Field of Search ................... 362/122, 123, 362/183, 192, 496, 540, 543, 544, 545, 806

(56) References Cited

U.S. PATENT DOCUMENTS

| 1,517,848 | A | * | 12/1924 | McClelland | 362/122 |
|---|---|---|---|---|---|
| D80,542 | S | | 2/1930 | Shoemaker | D11/120 |
| 2,115,358 | A | | 4/1938 | Buschman | 362/122 |
| D140,633 | S | | 3/1945 | Van Ess, Jr. | D11/120 |
| D206,124 | S | | 11/1966 | Burnbaum | D11/120 |
| 3,350,555 | A | | 10/1967 | Di Rico | 362/122 |
| 3,500,035 | A | | 3/1970 | Franc | 40/427 |
| 4,009,535 | A | | 3/1977 | Stock | 40/546 |
| 4,237,384 | A | | 12/1980 | Kennon | 290/55 |
| 4,658,597 | A | | 4/1987 | Shum | 62/235.1 |
| 5,016,145 | A | | 5/1991 | Singleton | 362/503 |
| D340,671 | S | | 10/1993 | Clark | D11/120 |
| 5,315,492 | A | | 5/1994 | Davenport | 362/122 |
| D356,752 | S | | 3/1995 | Ritter | D11/120 |
| D371,613 | S | | 7/1996 | Moore | D26/4 |
| 5,558,422 | A | * | 9/1996 | Sanford | 362/806 |
| 5,692,331 | A | | 12/1997 | Tipke | 40/591 |
| 6,086,214 | A | * | 7/2000 | Ridge | 362/192 |
| D437,252 | S | | 2/2001 | Schultz | D11/120 |
| 6,234,652 | B1 | | 5/2001 | Tang | 362/392 |
| D451,430 | S | | 12/2001 | Tsai | D11/120 |
| 6,540,370 | B1 | * | 4/2003 | Picklo | 362/122 |

FOREIGN PATENT DOCUMENTS

GB        984211        2/1965

* cited by examiner

*Primary Examiner*—Y My Quach Lee
(74) *Attorney, Agent, or Firm*—Richard C. Litman

(57) ABSTRACT

An illuminated vehicle wreath incorporating a direct lighting system energized by a vehicle's battery or combined with a one of a variety of power sources, such as a solar panel or wind driven electricity generator to energize the lighting system. The illuminated wreath may be fitted to an exterior or interior of a vehicle, and preferably to a grill of a vehicle using one or more ties.

16 Claims, 6 Drawing Sheets

ILLUMINATED HOLIDAY VEHICLE WREATH

CROSS-REFERENCE TO RELATED APPLICATION

This application claims the benefit of U.S. Provisional Patent Application Ser. No. 60/434,651, filed Dec. 20, 2002.

BACKGROUND OF THE INVENTION

1. Field of the Invention

The present invention relates to an illuminated wreath and, more particularly, to an illuminated holiday wreath for a motor vehicle.

2. Description of Related Art

Decorative wreaths are often displayed during holiday seasons, such as during the joyful Christmas season. Christmas holiday wreaths provide ornamentation which is often illuminated indirectly by using independent lights to shine light onto the wreath. However, indirect lighting systems are often expensive to buy and maintain and are not suitable for wreaths attached to road vehicles. Thus, there is a need for a wreath that does not require indirect lighting and which can be illuminated using a low voltage power source. More specifically, there is a need for a wreath arrangement incorporating a lighting system suitable for attachment to the exterior or interior of a vehicle and which does not place an overburdensome load on a vehicle's power supply.

Several efforts have been made to address these and other problems. U.S. Design Pat. No. 80,542, issued on Feb. 18, 1930 to Willis H. Shoemaker, shows an illuminated ornament for decorating Christmas trees, windows, and the like. The '542 ornament is not suitable for mounting on the exterior of a vehicle.

U.S. Pat. No. 5,016,145, issued on May 14, 1991 to Kent A. Singleton, describes an illuminated display vehicle ornament for mounting inside a vehicle. The '145 ornament includes a lighting system unable to withstand the rigors of outside use, and more particularly, is not suitable for attachment to the exterior of a motor vehicle.

U.S. Design Pat. No. 437,252 S, issued on Feb. 6, 2001 to Cliff W. Schultz, shows an ornamental design for a Christmas decoration adapted for vehicle use. While the Schultz decoration has electrical lights to directly illuminate the Christmas decoration, the lights are not energized by an alternative energy supply, such as a solar or wind generated electrical power supply. Thus, there is a need for a decorative wreath with a direct lighting system that can be energized by a solar or wind driven electrical power supply.

Other patents showing a wreath or ornament, but which do not solve the above mentioned problems include U.S. Design Pat. No. 140,633, issued on Mar. 20, 1945 to John C. Van Ess, Jr. (a design for an illuminated Christmas decoration); U.S. Design Pat. No. 206,124, issued on Nov. 1, 1966 to Jack Burnbaum (a Christmas ornament or similar article); U.S. Design Pat. No. 340,671, issued on Oct. 26, 1993 to Terrence B. Clark (a light wreath); U.S. Design Pat. No. 356,752, issued on Mar. 28, 1995 to Ronald A. Ritter (a wreath); U.S. Design Pat. No. 371,613, issued on Jul. 9, 1996 to Kay Moore (a decorative lighting fixture); U.S. Design Pat. No. 451,430 S, issued on Dec. 4, 2001 to George Tsai (an ornamental light wreath); and U.S. Pat. No. 2,115,358, issued on April, 26, 1938 to Abraham L. Buschman (a decorative illuminated device).

Further patents showing a wreath or ornament, but which do not solve the above mentioned problems includes U.S. Pat. No. 3,350,555, issued on Oct. 31, 1967, to Emidio Di Rico (a multi-colored light ornament construction); U.S. Pat. No. 3,500,035, issued on Mar. 10, 1970 to Charles Franc (an electrified packaging ornament); U.S. Pat. No. 5,315,492, issued on May 24, 1994 to Donald J. Davenport (an illuminated window display ornament); U.S. Pat. No. 5,692,331, issued on Dec. 2, 1997 to James Tipke (a vehicle-mounted advertising sign); U.S. Pat. No. 6,234,652 B1, issued on May 22, 2001 to Chi-Li Tang (a candle lamp decoration); United Kingdom (U.K.) Patent Application No. 180,613, published Jun. 1, 1922 (improvements in or relating to wreaths and wreath cases); and U.K. Patent No. 984,211, published Feb. 24, 1965 (wreath).

None of the above inventions and patents, taken either singly or in combination, is seen to describe the instant invention as claimed.

SUMMARY OF THE INVENTION

The present invention is an illuminated vehicle wreath incorporating a direct lighting system combined with one of a variety of alternative power sources, such as a solar panel or wind powered electricity generator to energize the lighting system. The illuminated wreath may be fitted to an exterior or interior of a vehicle, and preferably to a grill of a vehicle using an attachment device, such as one or more ties.

Accordingly, it is a principal aspect of the invention to provide an illuminated holiday wreath with direct lighting adapted for use on or in a vehicle.

It is another aspect of the invention to provide an illumination system to directly illuminate a wreath.

It is a further aspect of the invention to provide a wreath with an illumination system adapted to draw power via a vehicle's cigarette lighter.

It is a further aspect of the invention to provide a wreath in combination with a solar powered lighting system.

It is a further aspect of the invention to provide a wreath in combination with a wind powered lighting system.

It is an aspect of the invention to provide improved elements and arrangements thereof in an apparatus for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
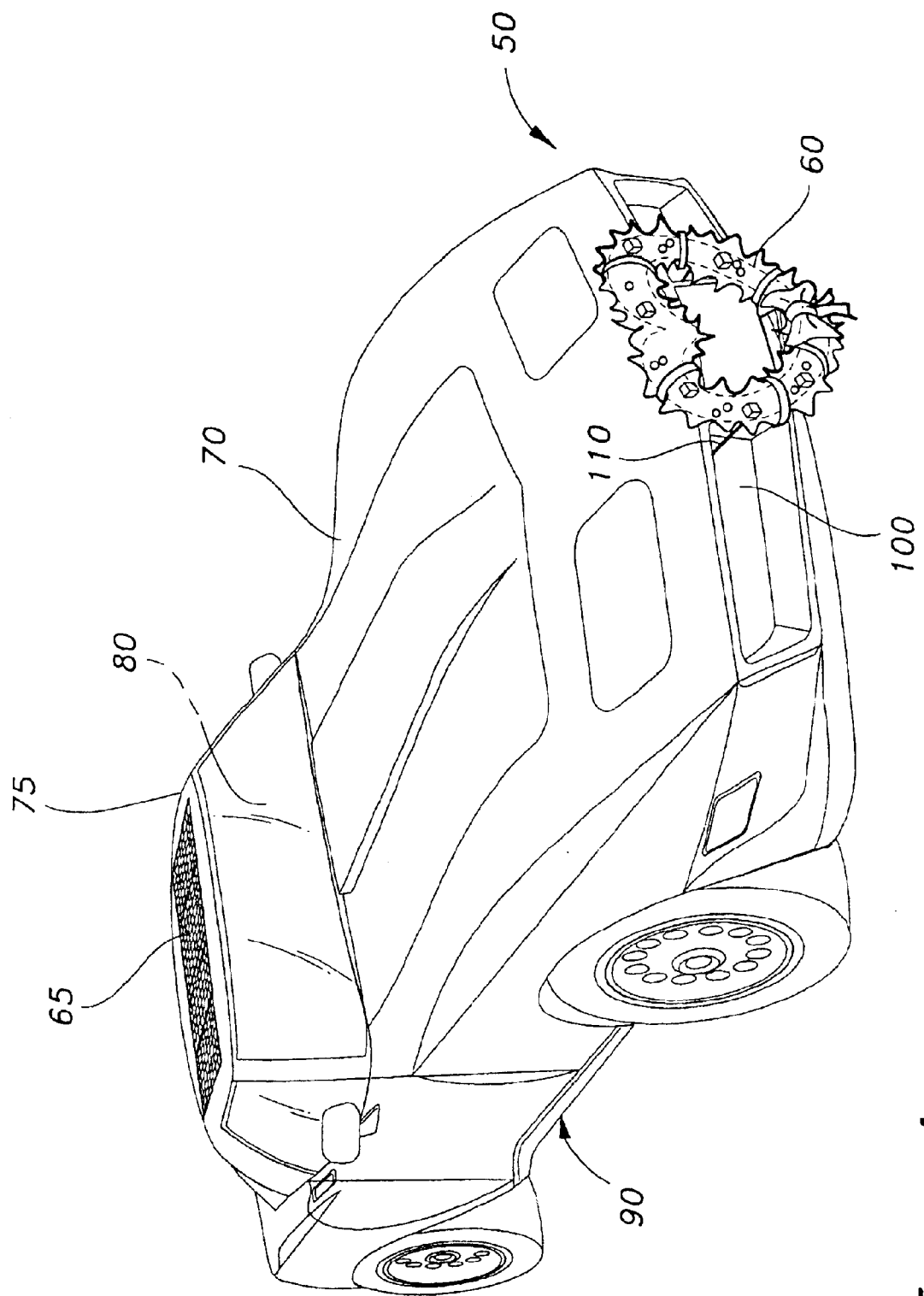
FIG. 1 is an environmental, perspective view of an illuminated holiday vehicle wreath according to the present invention.

The present invention relates to an illuminated vehicle wreath 50 incorporating a direct lighting system 60 combined with one of a variety of power sources, such as a solar array 65, to energize the lighting system 60. The illuminated wreath 50 may be fitted to an exterior 70 or interior 80 of a vehicle 90, and preferably to a grill 100 of a vehicle 90 using an attachment device, such as at least one tie 110.

It will be appreciated that the illuminated vehicle wreath 50 of the present invention can be located in a variety of different positions and orientations—including at various angles, sideways and even upside down. A detailed description of the illuminated vehicle wreath 50 of the present invention now follows.

FIG. 1 shows a perspective view of one embodiment of a wreath according to the present invention. The vehicle wreath 50 incorporates a direct lighting system 60, the wreath 50 is attached to a vehicle 90 and more specifically a vehicle grill 100 using at least one tie 110. A solar array 65 is located on the roof 75 of the vehicle 90. The solar array 65 comprises at least one photo-voltaic cell to energize the lighting system 60 (which comprises a string of lights 130, see e.g., FIG. 2). The illuminated wreath 50 may be fitted to an exterior 70 or interior 80 of the vehicle 90, but preferably to the grill 100 of the vehicle 90 using an attachment device, such as at least one tie 110.

Figure 2:
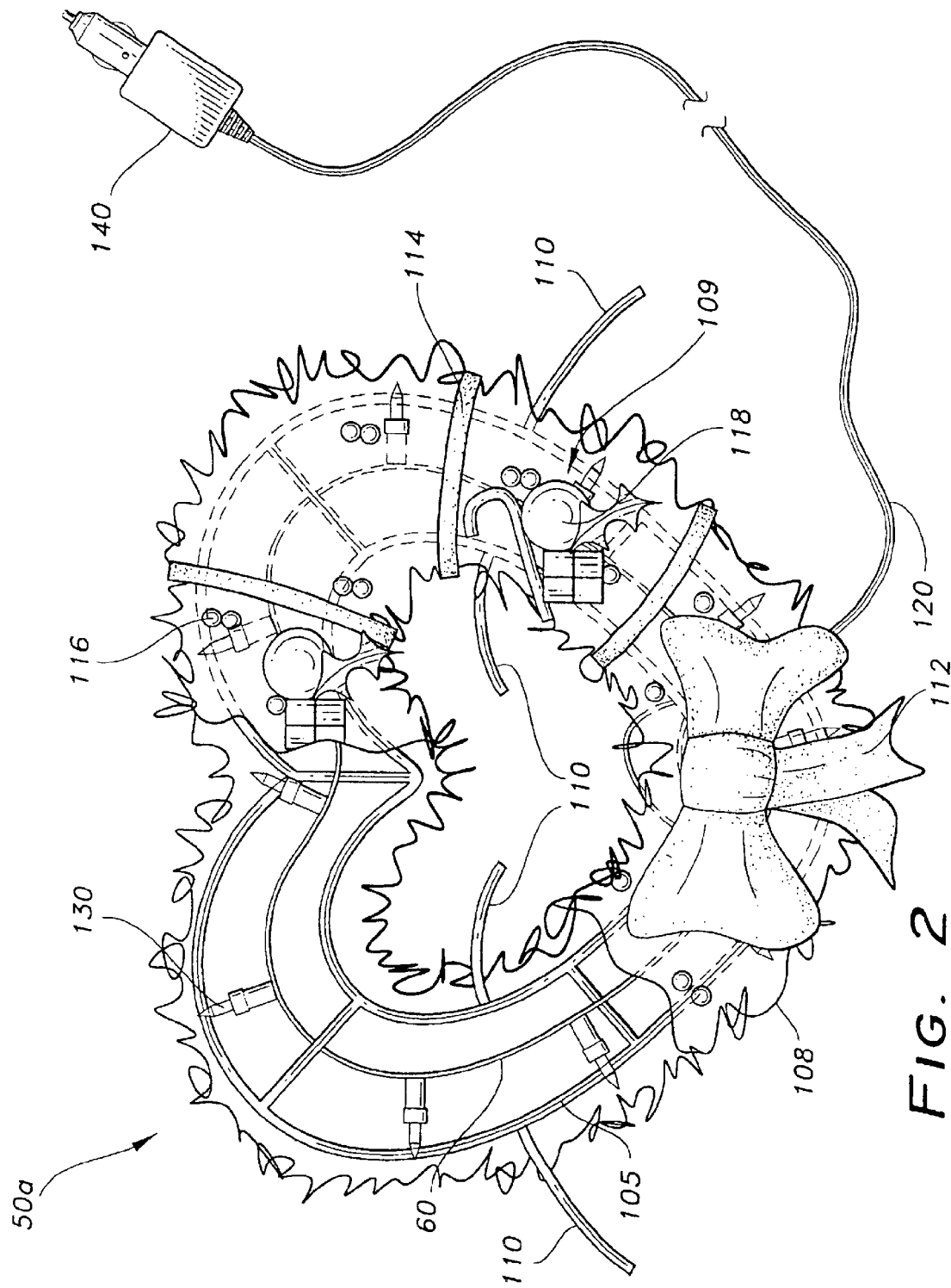
FIG. 2 shows a heart shaped wreath with a lighting system adapted to fit into a cigarette lighter.

FIG. 2 shows an illuminated wreath in the form of a heart shaped wreath 50a adapted for attaching to the exterior 70 of a vehicle 90. The wreath 50a comprises a generally planar frame 105 defining the outline 108 of the heart shaped wreath 50a. Ornamentation 109 is attached to the frame 105. The illumination system 60 comprises an electrical lead 120 defining a string of lights 130, wherein the lead extends about the frame 105 and ornamentation 109, thereby distributing the lights 130 about the frame 105 and ornamentation 109. One end of the electrical lead 120 is configured as a cigarette adapter 140 for connection to a vehicle's cigarette lighter receptacle (not shown). The ornamentation 109 may include one or more bows 112, ribbons 114, berries 116, and an assortment of decorations 118.

Still referring to FIG. 2, it should be understood that the lead 120 may take various forms which are within the spirit of the invention herein; e.g., the lead 120 may terminate in a female or male connector for attaching to a second lead with a complementary male or female connector at one end and the other end of lead terminating in the cigarette adapter 140. Thus, the description of the lead 120 is intended to also cover additional extensions of lead adapted to connect the lead 120 with to the vehicle's cigarette lighter (and hence the vehicle's battery).

The lighting system 60 is energized (i.e. supplied with electric current) at night from a battery or an alternative source of electric current, such as a solar cell. Alternatively, the lighting system 60 is energized by an electricity generator, such as dynamo driven by a wind-turbine or wind propeller to provide a wind-powered electric generator attached to the vehicle's exterior 70, preferably the vehicle's roof 75. The battery is preferably a rechargeable battery. The rechargeable battery may be supplied as a separate item, or may be the vehicle's battery.

If the rechargeable battery is supplied as a separate item, it may be located in various places such as in the vehicle interior 80 or inside the wreath 50. If the rechargeable battery is located inside the wreath 50, a void may be provided in the wreath 50 which is adapted to hold the rechargeable battery. Alternatively, the battery of the vehicle 90 may be used as the rechargeable battery. The battery may also be a non-rechargeable battery supplied with the wreath 50, such as a nine volt battery in a weather resistant container attached to the frame 105 of the wreath 50, or a plurality of low voltage batteries in series, or higher voltage batteries arranged in a parallel circuit configuration.

Figure 3:
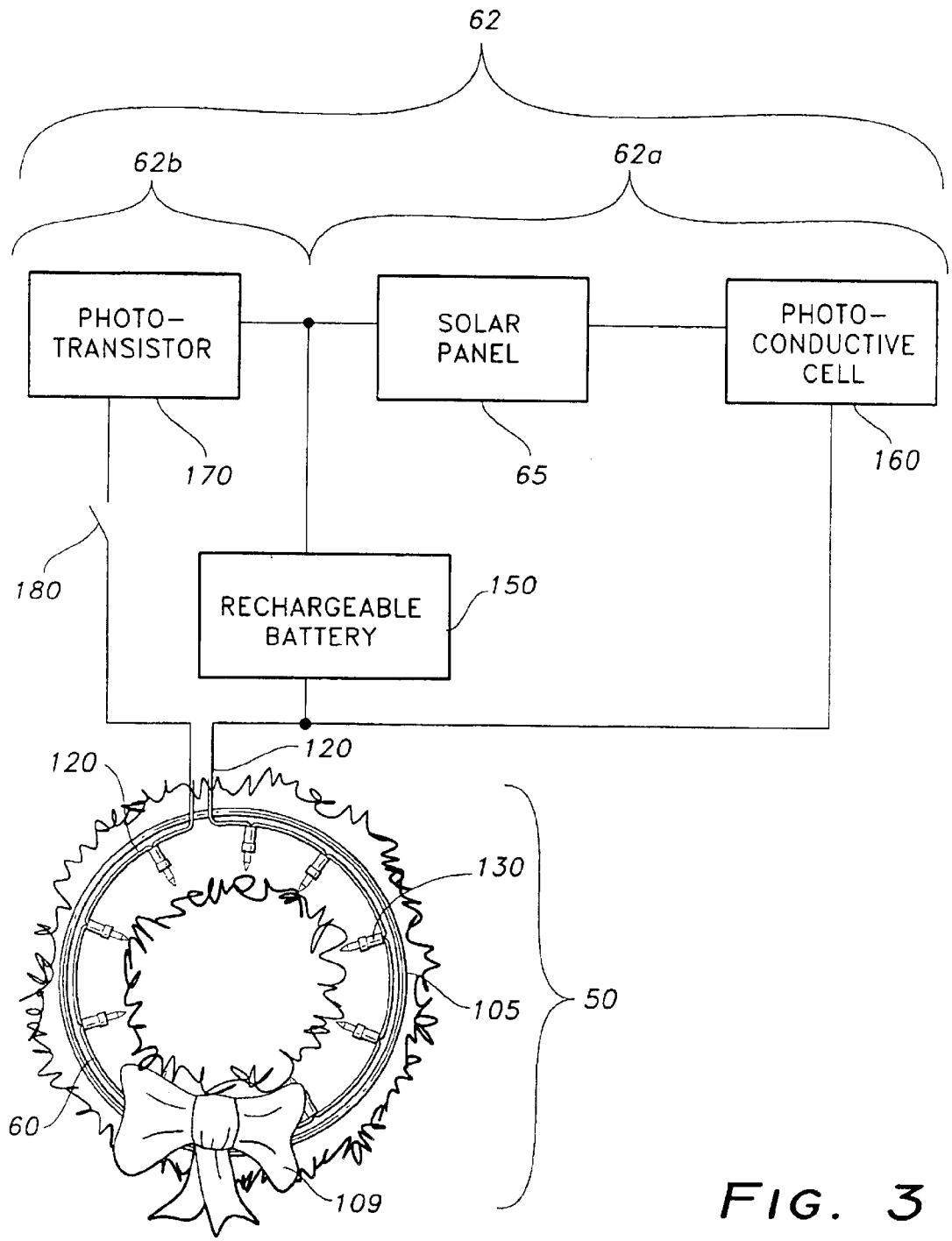
FIG. 3 is a schematic view of an illuminated holiday vehicle wreath adapted for both daylight and nighttime use.

FIG. 3 is a schematic diagram showing a circuit 62 comprising subcircuits 62a and 62b. The lighting system 60 is energized at night from a rechargeable battery 150. In daylight, the battery 150 is charged from the solar panel 65 which forms part of a battery charging circuit 62a. Alongside the solar panel 65, there is provided a photo-conductive cell 160 which is connected in a series with the solar panel 65 and rechargeable battery 150.

Still referring to FIG. 3, in daylight the solar panel 65 produces a voltage which is applied to the battery 150 via cell 160 which is rendered conductive by solar illumination impinging thereon. Battery 150 charges through the daylight hours, and when the sun sets, cell 160 is rendered nonconductive disconnecting the battery 150 from the solar panel 65. Solar panel 65 includes one or more solar cells. Photo-conductive cell 160 is a phototransistor configured to conduct when illuminated. Rechargeable battery 150 may be a nickel-cadmium (NiCad) or nickel metal hydride battery.

Still referring to FIG. 3, a load series circuit 62b is provided comprising a phototransistor 170 in series with the battery 150 and the lighting circuit lead 120. The phototransistor 170 is configured to be conductive in the absence of illumination. Thus, when the sun sets causing light levels to fall, the battery 150 is no longer being charged by the battery charging circuit 62a, and instead discharges through the load circuit 62b; thus at night the rechargeable battery 150 is isolated from the charging circuit 62a and is connected to the load circuit 62b for energizing the lighting system 60.

More specifically, at night the phototransistor 170 reconnects the battery 150 to the lights 130 to light the wreath 50. Conversely, during daylight hours, the battery 150 is disconnected from lighting system 60 by phototransistor 170, which acts as an open switch, allowing the rechargeable battery 150 to be charged by the solar panel 65.

The solar panel 65 preferably comprises at least one solar cell located in any convenient location on the exterior surface 70 of a vehicle 90 such as the roof 75 of the vehicle 90 (e.g., see FIG. 1).

An optional manually operated cut-off switch 180 can be used to disconnect the lights from the battery during night time hours in accordance with the preference of the driver of the vehicle 90. If the switch 180 is incorporated into load circuit 62b, it would normally be in the closed position unless specifically moved to the open position by the driver of the vehicle 90.

It should be appreciated that the lower the energy consumption required to light up the string of lights 130, the fewer the number required of photovoltaic cells in the solar panel 65. The rechargeable battery should be capable of storing a sufficient number of ampere-hours to energize the string of lights 130 for a few hours in the evening. 'It should be understood that the exact order of elements shown in FIG. 3 can be varied. For example, the phototransistor 170 can be integrated into the design of the wreath 50b so long as the phototransistor 170 is sufficiently exposed to allow daylight to interact with the phototransistor 170 to decrease its conductivity during daylight hours. Also, as described previously, if the battery 150 is provided as a separate item (i.e. the car battery is not used to power the lights 130) then this can also be integrated into the design of the wreath 50. The photoconductive cell 160 and phototransistor 170 may be integrated into the design of the solar panel 65. Thus, there are several ways in which the series circuits shown in FIG. 3 can be varied without deviating significantly from the spirit of the invention as claimed herein.

Figure 4:
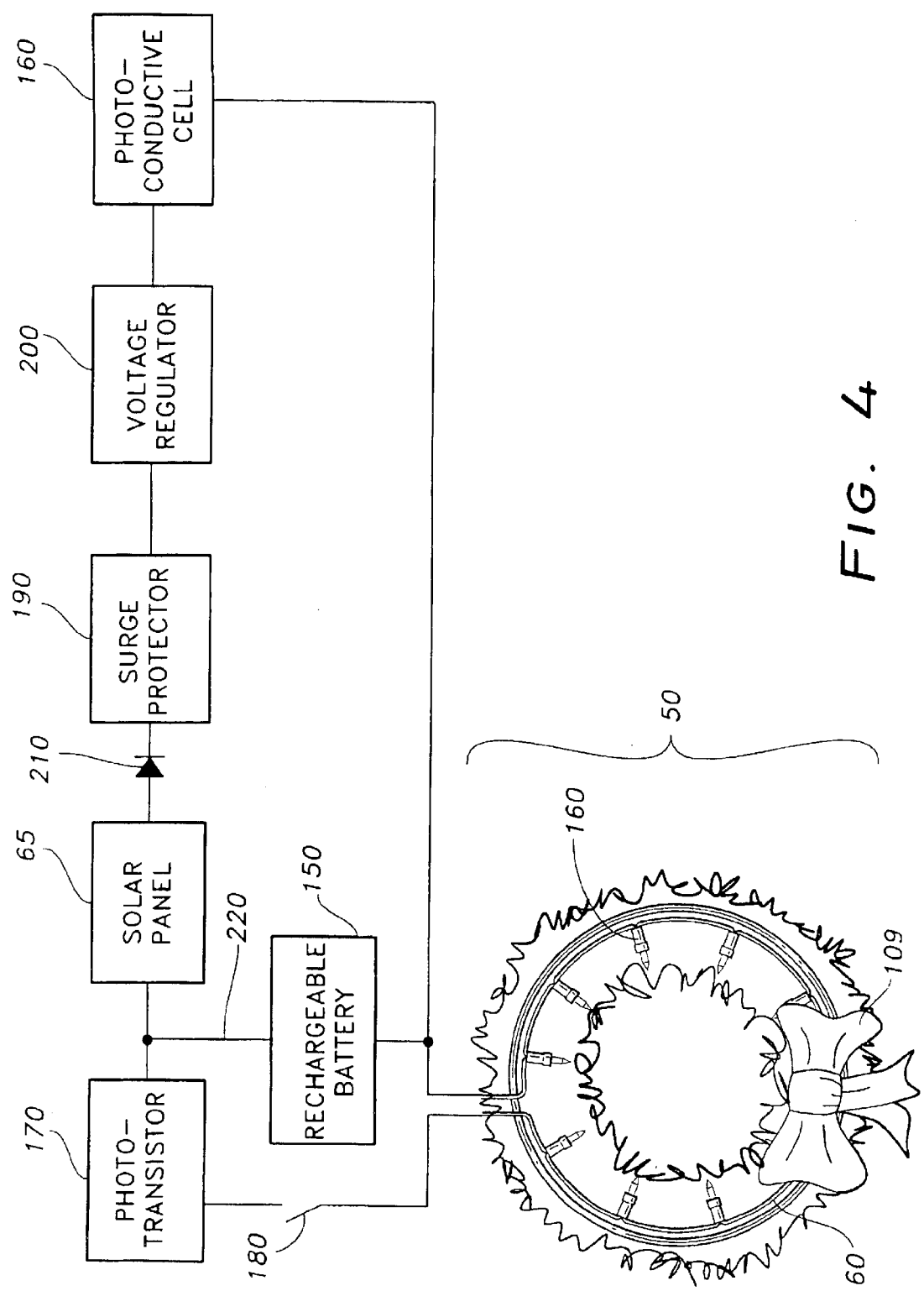
FIG. 4 is a schematic view of an illuminated holiday vehicle wreath according to the present invention with a solar powered electrical system with surge protection.

FIG. 4 shows a refinement of the wreath 50 of FIG. 3 which adds an optional surge protector 190, an optional voltage regulator 200, and one or more optional blocking diodes 210. The voltage regulator 200 regulates the voltage output from the solar panel 65, which operates only during daylight hours, to prevent overloading of the rechargeable battery 150.

The optional surge protector 190 effectively short-circuits lightning generated transients and protects the battery 150, along with other electrical components of the invention. The current return line 220 is normally chosen to be at ground potential. Thus, the circuit is adapted to handle an unwanted surge, as well as functioning as described above with regard to the embodiment as disclosed in FIG. 3.

Figure 5:
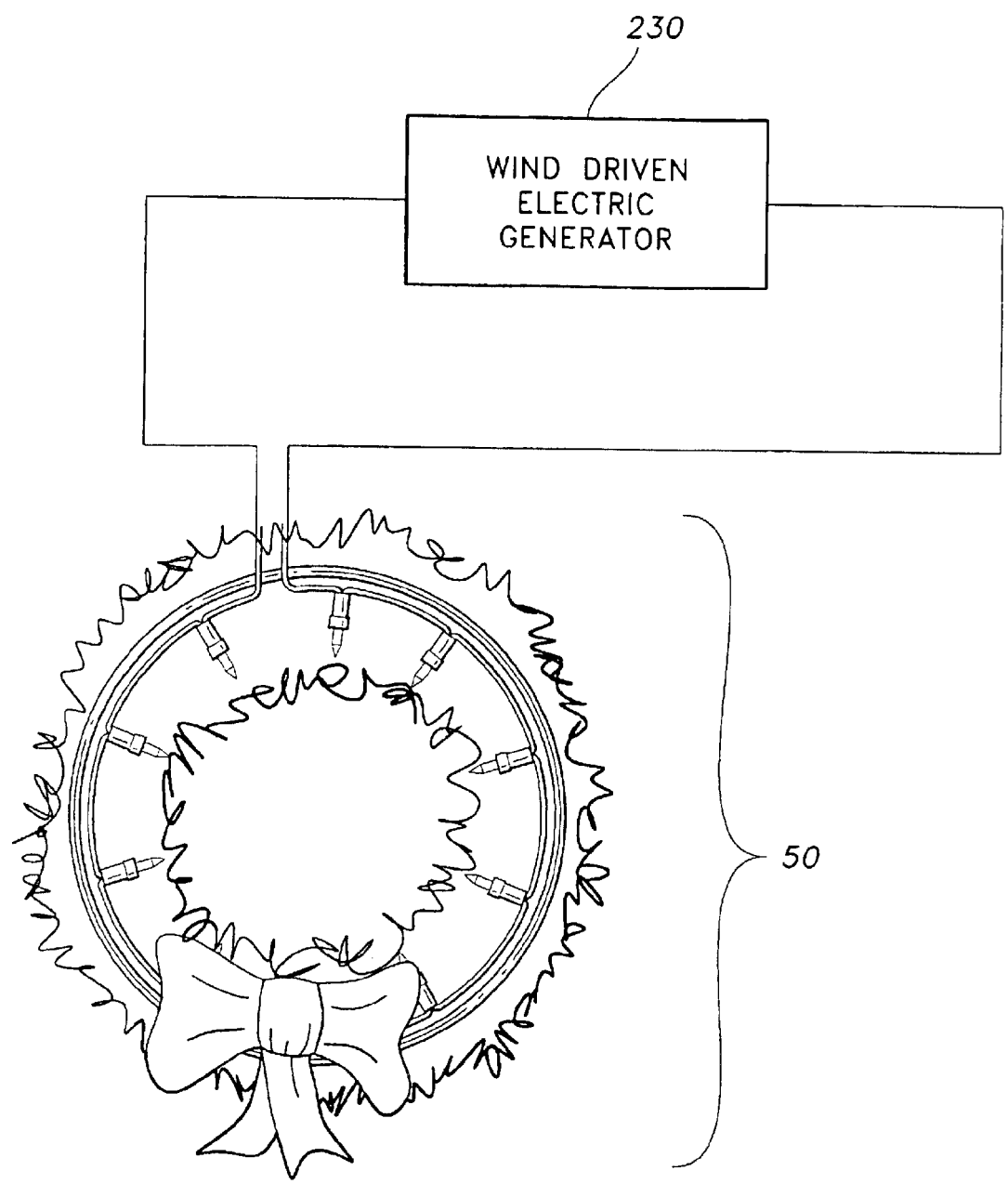
FIG. 5 is a schematic view of an illuminated holiday vehicle wreath with a wind powered electrical system.

FIG. 5 is a diagram showing a wreath 50 in which the direct lighting system 60 is powered by a wind-powered electric generator 230. The lights 60 are woven into the ornamentation of the wreath 50. The wind-powered electric generator 230 is fitted to the exterior 70 of the vehicle 90 such as the vehicle's roof 75. Driving the vehicle 90 causes air flow in direct relation to the speed of vehicle 90. The air flow drives the generator 230, which in turn generates a current in the circuit to drive the lights 60.

It should be understood that wind-powered electric generators are known in the art, including wind-powered electric generators which generate A.C. ("AC", i.e. alternating current) or D.C. ("DC", i.e. direct current) suitable for recharging a rechargeable battery 150. If a DC chargeable rechargeable battery 150 is incorporated in the circuit and coupled to a generator 230 comprising a wind powered AC (alternating current) generator then it is preferred that an AC/DC conversion circuit, or functional equivalent thereof, is used just upstream or adjacent to the battery 150 to enable safe recharging of the rechargeable battery 150. AC/DC conversion circuits are also well known in the art of electrical circuit construction and need not be elaborated on further. The lights may run on either AC or DC.

Wind electricity generators are well known. For example, the wind electricity generator 230 can take the form of a turbine wheel which includes a housing for enclosing an electrical generating apparatus adapted to be fitted to the roof 75 of a vehicle 90 as described in U.S. Pat. No. 4,237,384 ("the '384 patent") issued on Dec. 2, 1980 to Woodrow A. Kennon; the '384 patent is herein incorporated by reference in its entirety.

Additionally, the use of solar power (i.e. photovoltaic cells) during daylight are well known. For example, a solar power arrangement is described in U.S. Pat. No. 4,009,535 ("the '535 patent") issued on Mar. 1, 1977 to William Stock; the '535 patent is herein incorporated by reference in its entirety. The use of solar power (i.e. photo-voltaic cells) in combination with surge protection is described in U.S. Pat. No. 4,658,597 ("the '597 patent") issued on Apr. 21, 1987 to Shu Shum; the '597 patent is herein incorporated by reference in its entirety.

Figure 6:
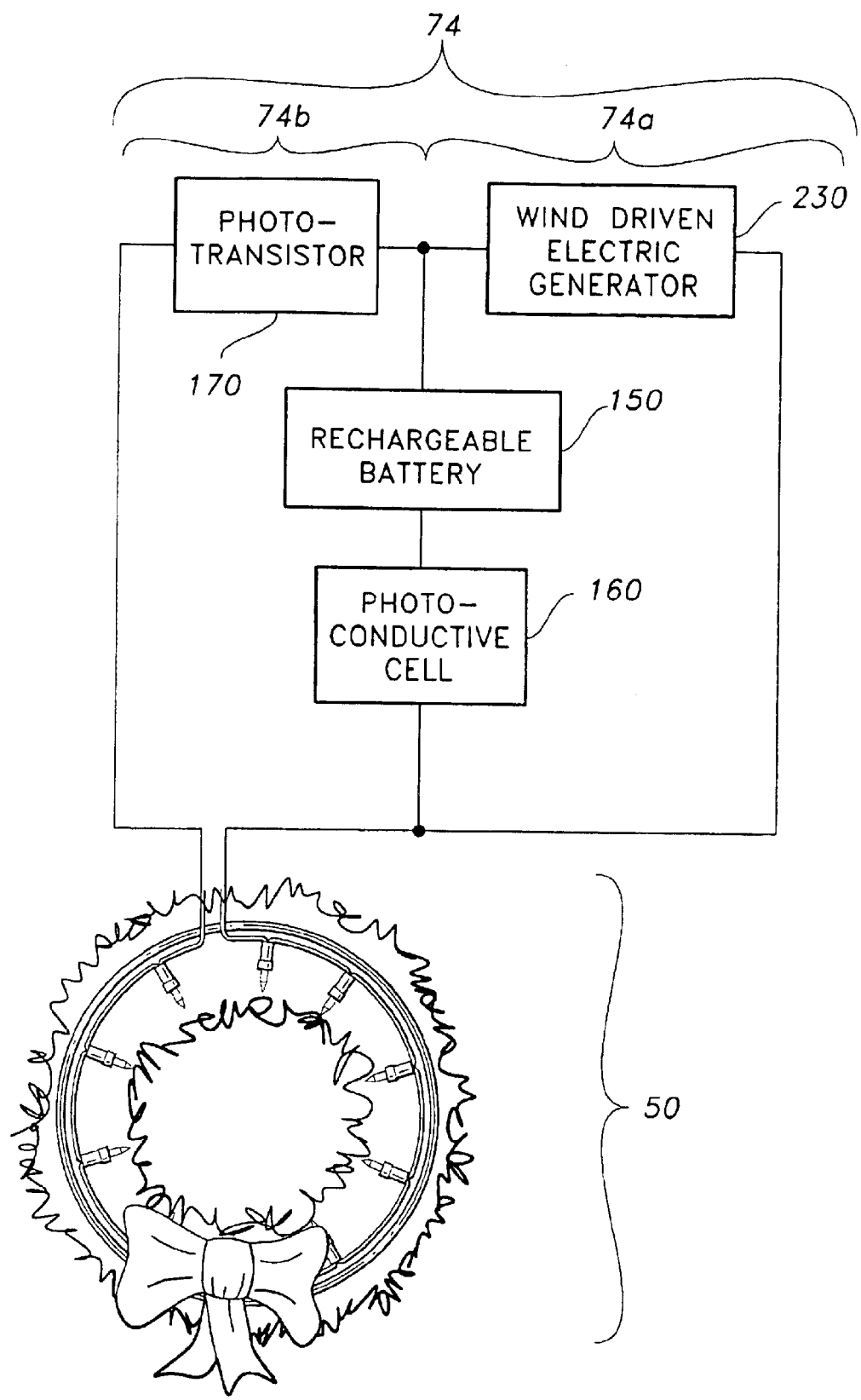
FIG. 6 is a schematic view of an illuminated holiday vehicle wreath with a wind powered electrical system adapted to charge a rechargeable battery during daylight and illuminate a wreath during nighttime.

FIG. 6 is a diagram showing a circuit 74 comprising subcircuits 74a and 74b. In daylight the wind-powered electric generator 230 produces a voltage which is applied to the rechargeable battery 150. Battery 150 charges through the daylight hours and when the sun sets, photo-conductive cell 160 is rendered non-conductive disconnecting the battery 150 from the generator 230. Photo-conductive cell 160 is a photo-transistor configured to conduct when illuminated, thus serving as a light sensitive switch. The photo-transistor 170 is configured so that in daylight the photo-transistor 170 does not conduct thus preventing current to run through the load circuit 74b to power the lights 60, whereas the photoconductive cell 160 conducts current only during light hours to allow electricity generated by the wind driven electric generator 230 to charge the rechargeable battery 150. Obviously, current is usually only generated by the wind driven electric generator 230 if the vehicle 90 is moving causing artificial wind to drive the wind driven electric generator 230.

Conversely, when the sun sets, photoconductive cell 160 is rendered non-conductive disconnecting the battery 150 from the generator 230 and current can flow through the lights 60 in circuit 74b because the photo-transistor 170 is conductive during dark hours (i.e. in the absence of light).

It should be understood that the wreath 50 may take different forms, e.g. a heart shape or circular shape (see, e.g. FIGS. 2 and 3, respectively). The wreath can be a holiday or good wishes wreath or a Christmas wreath.

It should be further understood that the invention described herein may be fitted to any type of vehicle such as a car-saloon, limo, SUV (sports utility vehicle), compact car, mid-sized car, motorized caravan, trailer (such as a caravan trailer), pickup truck, semi-truck, super-large or oversized or extreme commercial vehicles such as a very large quarry truck (e.g. any of the Caterpillar™ range of quarry trucks such as the 775E quarry truck and the D25D articulated truck), etc.

The invention may be adapted to fit into a cigarette lighter in the dashboard of a vehicle 90 (e.g. see FIG. 2). The string of lights 130 can be low voltage, e.g. twelve volt light emitting diodes ("LEDs").

The wreath 50 is preferably configured for easy cleaning, wherein its components parts may be removed for easy cleaning or maintenance. The wreath may come in the form of a designer wreath. The ornamentation 109 and string of lights 130 can be of different colors and shapes; likewise for any bow 112, ribbon 114, berries 116, or decorations 118 that form part of the ornamentation 109 or otherwise attached to the wreath 50. Where it is likely the wreath 50 will be removed often from the vehicle 90, it is preferred that the lead 120 consists of two sections, a first section extending from the wreath 50 and terminating after a short distance (e.g. about two feet) in a male connector configured to fit into a complementary female connector connected to one opposite end of a lead (see FIG. 3). The other opposite end of lead may comprise an adapter 140 configured to fit into a vehicle cigarette lighter (not shown) located in a dashboard of a vehicle 90. It should be understood that the connectors may be interchanged.

An optional cover for affording some level of protection to the wreath against an automatic car wash machine may be used to cover and protect the wreath. It is preferred that the cover is made of a transparent plastic and adapted to just fit over the wreath.

It is to be understood that the present invention is not limited to the sole embodiments described above, but encompasses any and all embodiments within the scope of the following claims.

I claim:

1. An illuminated wreath adapted for attachment to a motor vehicle, comprising:

a substantially planar frame defining an outline of a wreath;

ornamentation attached to the frame;

an illumination system having an electrical lead defining a string of lights, wherein the lead extends about the frame and ornamentation; and a power source connected to the illumination system, the power source including a power circuit having a wind driven generator and a rechargeable battery, the power circuit being electrically connected to the electrical lead for supplying electric current to the illumination system, and being configured to charge the rechargeable battery during daylight hours and to power the illumination system during nighttime hours.

2. The illuminated wreath of claim 1, further comprising a cigarette light adaptor electrically connected to the electrical lead.

3. The illuminated wreath of claim 1, wherein the power source comprises at least one photovoltaic cell.

4. The illuminated wreath of claim 1, wherein the power source further comprises at least one photovoltaic cell the rechargeable battery electrically connected to the electrical lead in the circuit configured to provide electrical power to the illumination system from the rechargeable battery during nighttime, and to charge the rechargeable battery in daylight.

5. The illuminated wreath of claim 4, further comprising a voltage surge protector.

6. The illuminated wreath of claim 1 further comprising a connector attached to the wreath for connecting the frame to a motor vehicle grill.

7. The illuminated wreath of claim 6, wherein the connector comprises at least one tie connecting the frame to the motor vehicle grill.

8. An illuminated wreath configured for attachment to an exterior of a motor vehicle, said wreath comprising:

a substantially planar frame defining an outline of a wreath, wherein the frame comprises a first opposite side and a second opposite side;

ornamentation attached to the first opposite side of the frame;

a low voltage illumination system comprising a weather resistant electrical lead defining a string of low voltage lights, wherein the lead extends about the frame and ornamentation, wherein a section of the lead extends away from the frame and ornamentation and terminates in a plug defining a connection;

a power source connected to the illumination system, the power source including a power circuit having a wind driven generator and a rechargeable battery, the power circuit being electrically connected to the electrical lead for supplying electric current to the illumination system, and being configured to charge the rechargeable battery during daylight hours and to power the illumination system during nighttime hours; and a connector to connect the frame to a motor vehicle grill, wherein the connector comprises at least one tie connected to the second opposite side of the frame and projecting therefrom to connect the frame to the motor vehicle grill.

9. The illuminated wreath of claim 8, further comprising a cigarette lighter adaptor adapted electrically connected to the electrical lead.

10. The illuminated wreath of claim 8, wherein the power source comprises at least one photovoltaic cell.

11. The illuminated wreath of claim 8, wherein the power source further comprises at least one photovoltaic cell the rechargeable battery electrically connected to the electrical lead in the circuit configured to provide electrical power to the illumination system from the rechargeable battery during nighttime, and to charge the rechargeable battery in daylight.

12. The illuminated wreath of claim 11, further comprising a voltage surge protector.

13. An illuminated wreath adapted for attachment to an exterior of a motor vehicle, comprising:

a substantially planar frame defining an outline of a wreath, wherein the frame comprises a first opposite side and a second opposite side;

ornamentation attached to the first opposite side of the frame;

a low voltage illumination system comprising, a weather resistant electrical lead defining a string of low voltage lights, wherein the lead extends about the frame and ornamentation, wherein a section of the lead extends away from the frame and ornamentation and is connected to a power supply circuit, the power supply circuit having a wind driven generator and a rechargeable battery, the power circuit being electrically connected to the electrical lead for supplying electric current to the illumination system, and being configured to charge the rechargeable battery during daylight hours and to power the illumination system during nighttime hours; and a connector to connect the frame to a motor vehicle grill, wherein the connector comprises at least one tie connected to the second opposite side of the frame and projecting therefrom to connect the frame to the motor vehicle grill.

14. The illuminated area of claim 13, wherein the power circuit comprises at least one photovoltaic cell.

15. The illuminated wreath of claim 13, wherein the power supply circuit further comprises at least one photovoltaic cell the rechargeable battery electrically connected to the electrical lead in the circuit configured to provide electrical power to the illumination system from the rechargeable battery during nighttime, and to charge the rechargeable battery in daylight.

16. The illuminated wreath of claim 15, further comprising a voltage surge protector.

* * * * *